US011200528B2

(12) United States Patent
Moriwaki et al.

(10) Patent No.: US 11,200,528 B2
(45) Date of Patent: *Dec. 14, 2021

(54) DATA INTEGRATED ANALYSIS SYSTEM

(71) Applicant: HITACHI, LTD., Tokyo (JP)

(72) Inventors: Norihiko Moriwaki, Tokyo (JP); Kazuo Yano, Tokyo (JP); Nobuo Sato, Tokyo (JP); Shinichi Fukuma, Tokyo (JP); Hiroyuki Tomita, Tokyo (JP); Miki Hayakawa, Tokyo (JP); Norio Ohkubo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 16/559,712

(22) Filed: Sep. 4, 2019

(65) Prior Publication Data
US 2019/0392362 A1 Dec. 26, 2019

Related U.S. Application Data

(63) Continuation of application No. 14/049,063, filed on Oct. 8, 2013, now Pat. No. 10,445,676.

(30) Foreign Application Priority Data

Oct. 16, 2012 (JP) ................................. 2012-228520

(51) Int. Cl.
*G06Q 10/06* (2012.01)
(52) U.S. Cl.
CPC ............................... *G06Q 10/0639* (2013.01)

(58) Field of Classification Search
CPC .................................................. G06Q 10/0639
See application file for complete search history.

(56) References Cited

U.S. PATENT DOCUMENTS

| 5,237,498 A | * | 8/1993 | Tenma | ................. G06Q 40/12 705/30 |
| 5,873,251 A | * | 2/1999 | Iino | ....................... F01K 13/02 60/660 |

(Continued)

FOREIGN PATENT DOCUMENTS

| JP | 2000-20504 A | 1/2000 |
| JP | 2002-7659 A | 1/2002 |

(Continued)

OTHER PUBLICATIONS

Japanese Office Action received in corresponding Japanese Application No. 2012-228520 dated May 10, 2016.

*Primary Examiner* — Arif Ullah
(74) *Attorney, Agent, or Firm* — Mattingly & Malur, PC

(57) ABSTRACT

A generation technique and an analysis technique of a large number of explanatory variables to derive effective measures by using various data are provided. Specifically, a factor which lurks in a large amount of data and affects business performance is identified by automatically generating a large number of explanatory variables and performing correlation analysis between the explanatory variables and an objective variable. Three operators representing condition, target, and arithmetic which are variable generation conditions are defined in advance for data inputted into an analysis system and a large number of explanatory variables are automatically generated by these operators.

11 Claims, 14 Drawing Sheets

(56) References Cited

U.S. PATENT DOCUMENTS

| | | | | |
|---|---|---|---|---|
| 2009/0006286 A1* | 1/2009 | Angell | ............... | G06Q 30/0255 |
| | | | | 706/12 |
| 2009/0112683 A1* | 4/2009 | Hamilton, II | .......... | G06Q 30/02 |
| | | | | 705/7.32 |
| 2011/0264492 A1* | 10/2011 | Anand | ............... | G06Q 30/0201 |
| | | | | 705/14.4 |
| 2011/0282662 A1* | 11/2011 | Aonuma | ................. | G10L 17/26 |
| | | | | 704/231 |
| 2013/0226821 A1* | 8/2013 | Chetwynd | .......... | G06Q 50/2057 |
| | | | | 705/328 |

FOREIGN PATENT DOCUMENTS

| | | |
|---|---|---|
| JP | 2002-334275 A | 11/2002 |
| JP | 2005-62963 A | 3/2005 |
| JP | 2011-150496 A | 8/2011 |
| WO | 2005/111880 A1 | 11/2005 |

* cited by examiner

F I G. 4

| CUSTOMER ID | TIME INFORMATION | | | | STAYING TIME OF CUSTOMER | | | | | | PURCHASE PRICE OF CUSTOMER | | | | | | NUMBER OF EMPLOYEES WHO SERVE THE CUSTOMER FOR EACH AREA | | | | | |
|---|---|---|---|---|---|---|---|---|---|---|---|---|---|---|---|---|---|---|---|---|---|---|
| | DATA | CHECKOUT COUNTER PASSING TIME | ENTERING TIME | LEAVING TIME | WHOLE ENTIRE STORE | AREA 1 | AREA 2 | AREA 3 | AREA 4 | AREA 5 | ENTIRE STORE | AREA 1 | AREA 2 | AREA 3 | AREA 4 | AREA 5 | WHOLE ENTIRE STORE | AREA 1 | AREA 2 | AREA 3 | AREA 4 | AREA 5 |
| 1 | 2012/6/18 | 9:25:00 | 9:20:00 | 9:29:00 | 110 | 25 | 0 | 10 | 10 | 65 | 677 | 300 | 0 | 0 | 0 | 377 | 2 | 2 | 0 | 0 | 0 | 0 |
| 2 | 2012/6/18 | 0 | 9:24:00 | 9:35:00 | 270 | 75 | 10 | 10 | 15 | 160 | 0 | 0 | 0 | 0 | 0 | 0 | 0 | 0 | 0 | 0 | 0 | 0 |
| 3 | 2012/6/18 | 9:52:00 | 9:34:00 | 9:52:00 | 560 | 10 | 0 | 15 | 495 | 40 | 239 | 239 | 0 | 0 | 0 | 0 | 0 | 0 | 0 | 0 | 0 | 0 |
| 4 | 2012/6/18 | 9:59:00 | 9:44:00 | 10:06:00 | 17 | 10 | 0 | 3 | 3 | 0 | 600 | 0 | 0 | 322 | 278 | 0 | 0 | 0 | 0 | 0 | 0 | 0 |
| 5 | 2012/6/18 | 9:56:00 | 9:52:00 | 9:57:00 | 380 | 190 | 0 | 0 | 0 | 190 | 699 | 0 | 0 | 0 | 0 | 699 | 1 | 1 | 0 | 0 | 0 | 0 |
| 6 | 2012/6/18 | 10:12:00 | 10:07:00 | 10:11:00 | 140 | 5 | 0 | 15 | 120 | 0 | 2300 | 2300 | 0 | 0 | 0 | 0 | 0 | 0 | 0 | 0 | 0 | 0 |
| 7 | 2012/6/18 | 10:18:00 | 10:09:00 | 10:15:00 | 10 | 10 | 0 | 0 | 0 | 0 | 1410 | 1410 | 0 | 0 | 0 | 0 | 1 | 1 | 0 | 0 | 0 | 0 |
| 8 | 2012/6/18 | 10:27:00 | 10:12:00 | 10:28:00 | 466 | 0 | 3 | 30 | 410 | 22 | 3259 | 0 | 59 | 0 | 3200 | 0 | 0 | 0 | 0 | 0 | 0 | 0 |
| 9 | 2012/6/18 | 10:35:00 | 10:25:00 | 10:36:00 | 295 | 280 | 0 | 15 | 0 | 0 | 543 | 0 | 0 | 0 | 0 | 543 | 1 | 0 | 0 | 0 | 1 | 0 |
| 10 | 2012/6/18 | 10:53:00 | 10:32:00 | 10:53:00 | 157 | 120 | 0 | 0 | 8 | 28 | 338 | 338 | 0 | 0 | 0 | 0 | 1 | 1 | 0 | 0 | 0 | 0 |
| 11 | 2012/6/18 | 11:00:00 | 10:48:00 | 11:05:00 | 75 | 5 | 0 | 8 | 23 | 38 | 1779 | 0 | 325 | 457 | 997 | 0 | 0 | 0 | 0 | 1 | 0 | 0 |
| 12 | 2012/6/18 | 11:43:00 | 10:59:00 | 11:46:00 | 1075 | 75 | 835 | 85 | 25 | 55 | 2885 | 543 | 2342 | 0 | 0 | 0 | 3 | 1 | 1 | 1 | 0 | 0 |

FIG. 5

| TIME INFORMATION | PURCHASE PRICE | | | | | | THE NUMBER OF PURCHASED ITEMS | | | | | | POSITIONS OF SALES CLERKS (REGULAR EMPLOYEES + PART-TIMERS) (TOTAL NUMBER) | | | | | |
|---|---|---|---|---|---|---|---|---|---|---|---|---|---|---|---|---|---|---|
| 30-MINUTE TIME PERIOD | ENTIRE STORE (AREA 01 - AREA 16) | AREA 1 | AREA 2 | AREA 3 | AREA 4 | AREA 5 | ENTIRE STORE (AREA 01 - AREA 16) | AREA 1 | AREA 2 | AREA 3 | AREA 4 | AREA 5 | WHOLE ENTIRE STORE | AREA 1 | AREA 2 | AREA 3 | AREA 4 | AREA 5 |
| 2012-06-18 09:00:00-09:30:00 | 15197 | 7775 | 0 | 5683 | 359 | 1377 | 21 | 9 | 0 | 7 | 1 | 4 | 267 | 255 | 0 | 8 | 3 | 0 |
| 2012-06-18 09:30:00-10:00:00 | 37933 | 18120 | 0 | 7644 | 3955 | 8214 | 81 | 25 | 0 | 10 | 6 | 40 | 703 | 72 | 143 | 178 | 127 | 182 |
| 2012-06-18 10:00:00-10:30:00 | 45710 | 13853 | 697 | 10136 | 14199 | 6825 | 83 | 20 | 2 | 15 | 30 | 16 | 931 | 588 | 218 | 42 | 3 | 79 |
| 2012-06-18 10:30:00-11:00:00 | 36823 | 17648 | 3779 | 6966 | 6509 | 1921 | 62 | 22 | 3 | 15 | 12 | 10 | 1595 | 618 | 623 | 113 | 122 | 118 |
| 2012-06-18 11:00:00-11:30:00 | 76959 | 29423 | 2778 | 13867 | 23748 | 7143 | 136 | 26 | 3 | 31 | 45 | 31 | 1177 | 715 | 5 | 127 | 147 | 183 |
| 2012-06-18 11:30:00-12:00:00 | 71162 | 25656 | 5474 | 10344 | 24151 | 5537 | 100 | 26 | 7 | 18 | 23 | 26 | 1208 | 660 | 20 | 35 | 55 | 438 |
| 2012-06-18 12:00:00-12:30:00 | 21673 | 14634 | 298 | 2765 | 797 | 3179 | 75 | 23 | 1 | 15 | 3 | 33 | 393 | 150 | 5 | 57 | 38 | 143 |
| 2012-06-18 12:30:00-13:00:00 | 30084 | 8990 | 2993 | 9340 | 5632 | 3129 | 90 | 16 | 5 | 19 | 9 | 41 | 370 | 275 | 5 | 13 | 48 | 28 |
| 2012-06-18 13:00:00-13:30:00 | 43763 | 15075 | 798 | 4292 | 8594 | 15004 | 96 | 22 | 2 | 9 | 27 | 36 | 343 | 85 | 40 | 38 | 152 | 28 |
| 2012-06-18 13:30:00-14:00:00 | 39325 | 15781 | 0 | 2744 | 15220 | 5580 | 73 | 18 | 0 | 6 | 13 | 36 | 358 | 155 | 18 | 32 | 48 | 105 |
| 2012-06-18 14:00:00-14:30:00 | 38100 | 19363 | 549 | 8648 | 1056 | 8484 | 84 | 30 | 1 | 20 | 3 | 30 | 948 | 145 | 13 | 35 | 657 | 98 |
| 2012-06-18 14:30:00-15:00:00 | 63131 | 38857 | 4012 | 6986 | 5189 | 8087 | 109 | 41 | 6 | 14 | 4 | 44 | 148 | 0 | 0 | 20 | 10 | 110 |

DATA INTEGRATED ANALYSIS SYSTEM

CLAIM OF PRIORITY

The present application claims priority from Japanese patent application JP 2012-228520 filed on Oct. 16, 2012, the content of which is hereby incorporated by reference into this application.

BACKGROUND

The present invention relates to a data analysis system for supporting management by using business activity data such as management data and sensing data.

As a large amount of data related to business management is accumulated along with development of the information and communications technology, a method is required in which even a non-specialist of analysis can easily derive measures effective for management by utilizing the large amount of data. In conventional methods, generally, a manager or an analyst establishes a hypothesis according to their own experience and intuition and performs analysis by collecting data in order to verify the hypothesis or a methodology of a skilled analyst is converted into template and developed. In these conventional methods, the establishment of the hypothesis depends on human ability, so that a range of measures to be obtained is limited.

For example, for managing a store, a technique is known which analyzes information of the numbers of purchased items and the unit prices of the items from a POS system, purchase behavior of customers, service behavior of employees, and the like together (International Publication No. WO2005-111880). In this analysis method, a data set of explanatory variables of behavior information and the like used to increase the numbers of purchased items and the unit prices of the items as an objective variable is based on hypothesis setting set by an analyst in advance.

SUMMARY

An analysis method for deriving effective measures to improve business performance by utilizing various data is required. However, so far, a method is generally used in which a manager or an analyst establishes a hypothesis and performs analysis by collecting data in order to verify the hypothesis or a methodology of a skilled analyst is converted into template and developed. Therefore, a range of measures to be obtained is limited. Thus, an object of the present invention is to provide a technique that automatically generates a large number of explanatory variables as an analysis method for deriving effective measures by using various data.

To solve the above problem, an integrated data analysis system using a storage unit that stores data and variable generation condition information is used. The integrated data analysis system includes an explanatory variable generation unit that generates explanatory variables related to the data by using the variable generation condition information, an objective variable input unit that receives an input of an objective variable, a correlation calculation unit that calculates correlation between the objective variable and the explanatory variables, and a display unit that displays the correlation on a screen.

Regarding management which conventionally depends on experience and intuition of a manger or a store manager, it is possible to automatically generate a large number of explanatory variables and support effective measures introduction activity to improve target such as profit.

BRIEF DESCRIPTION OF THE DRAWINGS

FIG. 4 is a diagram showing an example of indexes generated by the present invention;

FIG. 5 is a diagram showing an example of indexes generated by the present invention;

DETAILED DESCRIPTION

First Embodiment

Figure 10:
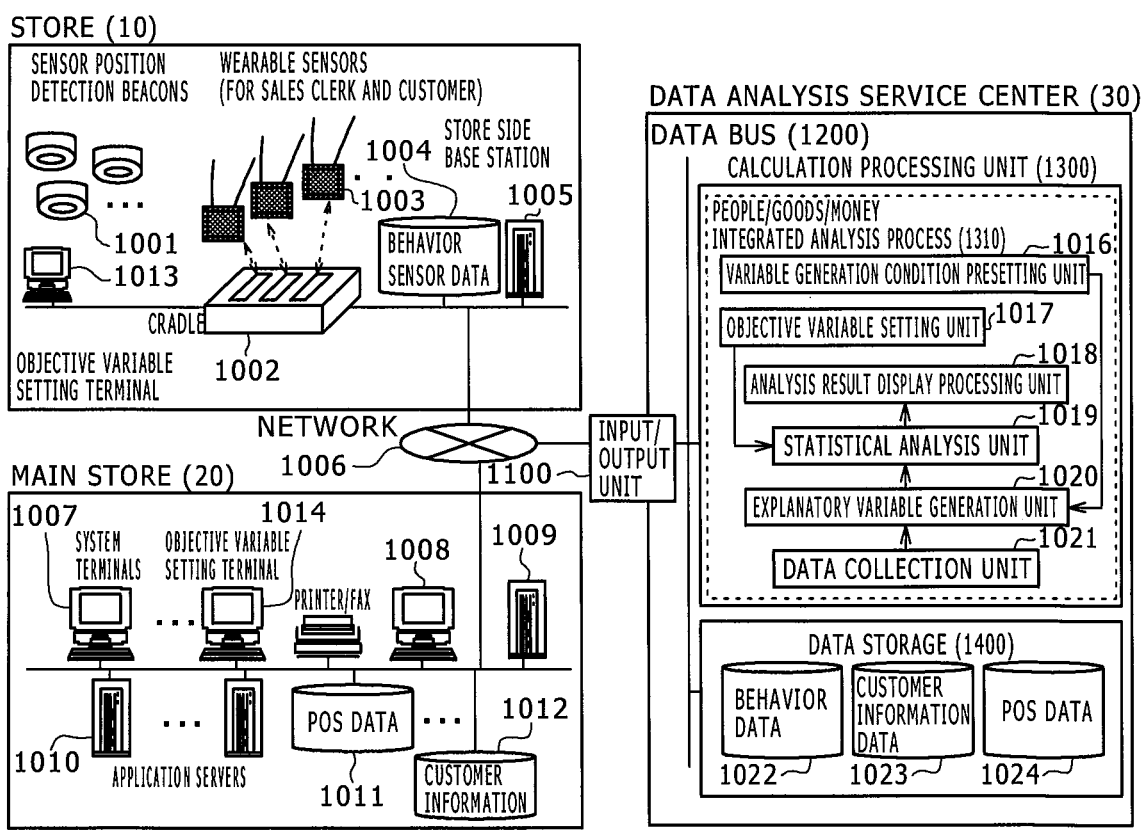
FIG. 10 is a diagram showing an example of a system configuration in a people/goods/money integrated analysis engine of the present invention.

FIG. 10 is a diagram showing a specific example of a case in which the present invention is applied to a store. A configuration and data processing of each of a store (10), a main store (20) which controls the stores, and a data analysis service center (30) which is operated by an external analysis service institution will be described. A system of the store (10) in FIG. 10 includes sensor location detection beacons (1001) which are fixed to a store shelf, a wall, and the like and transmit a location signal, wearable sensors (1003) which are worn by customers and employees and detect a customer flow line and an employee's customer service situation, and a cradle (1002) which charges the wearable sensor and transmits data temporarily stored in the wearable sensor to outside when the wearable sensor is inserted. Behavior sensor data (1004) transmitted from the cradle is transmitted to a data analysis service center (30) through a store side base station (1005) via a network. Sales information and the like of the store (10) are collected to the main store through a route not shown in FIG. 10.

A system of the main store (20) includes POS data (1011) collected from the stores (10) and customer information (1012) as well as system terminals (1007) and application servers (1010) which process the above various data. The POS data (1011) and the customer information (1012) are transmitted to the data analysis service center (30) through a network (1006).

The data analysis service center (30) in FIG. 10 includes a calculation processing unit (1300) that analyzes data collected from the stores (10) and the main store (20) through an input/output unit (1100), a data storage (1400) that stores data, and a data bus (1200) for performing data communication in the service center. The behavior sensor data (1004), the POS data (1011), and the customer information (1012) transmitted from the stores (10) and the main store (20) are stored in separate databases in the data storage (1400), specifically, a behavior database (1022), a customer information database (1023), and a POS database (1024), from the input/output unit (1100) through the data bus (1200). Although not shown in the figures, climate information, environment information, and the like for each region that can be obtained from the Internet or the like may be stored in the data storage.

In the calculation processing unit (1300) in FIG. 10, a "people/goods/money integrated analysis process (1310)" is performed. Further, the "people/goods/money integrated analysis process (1310)" includes four processing units, which are a data collection unit (1021), explanatory variables generation unit (1020), a statistical analysis unit (1019), and an analysis result display processing unit (1018).

Data is inputted and collected in the data collection unit (1021) in the "people/goods/money integrated analysis process" in FIG. 10 from each database (1022, 1023, and 1024) and appropriate alignment processing is performed. For example, the temporal granularity of the data (1023 and 1024) is re-calculated according to a fine temporal granularity (for example, for each 10 seconds) of the behavior data (1022) and the data (1023 and 1024) are stored as data having the same time granularity. The explanatory variables generation unit (1020) generates a large number (10,000 or more) of indexes (explanatory variables) from the above data by a generation logic described later. The generation logic is set by a variable generation condition presetting unit (1016) in advance. Subsequently, the statistical analysis unit (1019) checks a relationship between a numerical value (objective variable) to be a result and numerical value (explanatory variables) to be possible causes and performs statistical calculation (for example, regression analysis) to clarify the relationship. The statistical analysis unit (1019) is provided with an objective variable setting unit (1017) which is a user interface to set an objective variable. In the statistical analysis unit (1019), for example, it is possible to statistically (comprehensively) calculate explanatory variables highly correlated to a management index (objective variable) such as sales. In the analysis result display processing unit (1018), ranking processing for listing explanatory variables in descending order of statistical correlation with objective variable, that is, influence on the objective variable, and feasibility determination whether the measures to control explanatory variables are easy or difficult are performed by using a result of the statistical analysis unit (1019).

Figure 1:
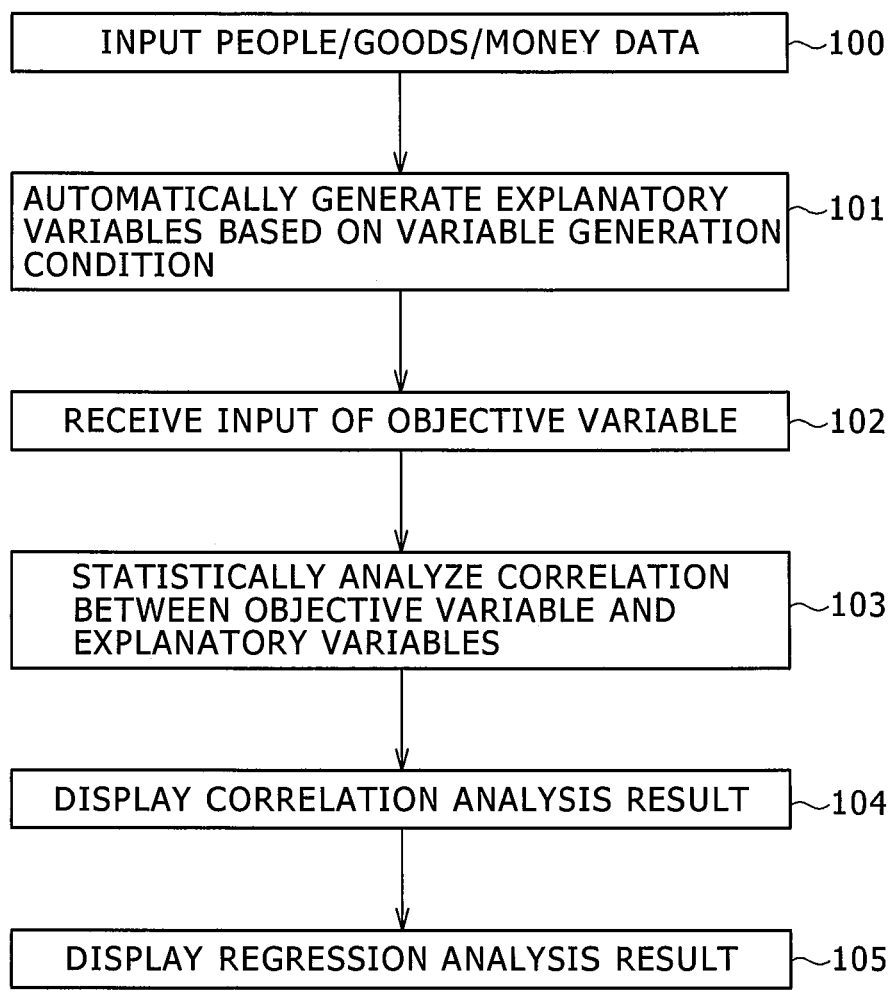
FIG. 1 is a flowchart of a data analysis system of the present invention.

FIG. 1 shows an analysis procedure which is characteristic of the analysis system. First, people/goods/money data, which is the base of index calculation, is inputted into the analysis system (step 100) and explanatory variables are automatically generated based on a variable generation condition (step 101). Next, when an objective variable such as management values are inputted into the system (step 102) by an objective variable setting terminal (1013) shown in FIG. 10, the analysis system statistically analyzes correlation between the objective variable inputted in step 102 and the explanatory variables generated in step 101 (step 103), and thereafter, as a result of the statistical analysis, a correlation analysis result showing strength and weakness of influence relation between the variables and a regression analysis result showing how much the objective variable can be explained by the explanatory variables, specifically a regression formula of relationship between the explanatory variables and the objective variable (the regression formula is represented by y=ax+b (x: explanatory variable, y: objective variable)) are displayed (steps 104 and 105). As shown in this procedure, a point that there is a step of automatically generating a large number of explanatory variables on the basis of the variable generation condition is a characteristic of the present invention.

Figure 2:
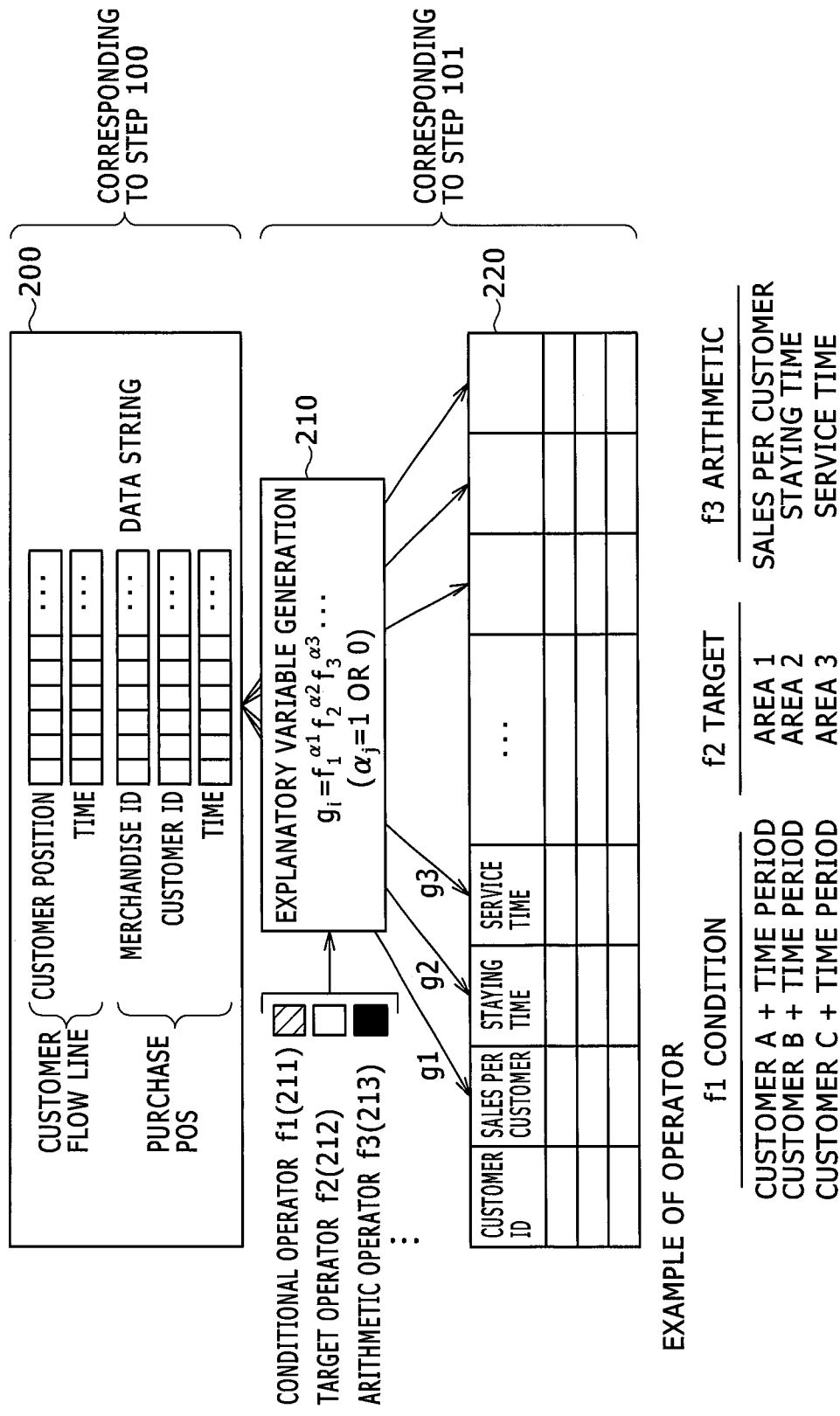
FIG. 2 is a diagram showing an index generation method of the data analysis system of the present invention.

FIG. 2 explains the details of the method of automatically generating a large number of explanatory variables shown in steps 100 and 101 in FIG. 1 in the explanatory variable generation unit (1020) in FIG. 10.

When a data string (200) is inputted into the explanatory variable generation unit (1020), explanatory variables are generated (220) by an explanatory variable generation process (210) including a set of three operators, a conditional operator (211), a target operator (212), and an arithmetic operator (213), which are set in advance. The conditional operator and the target operator may be combined and handled as one operator.

In the conditional operator, an activity main body such as a salesclerk and a customer and a range of time condition and the like are set. The target operator (212) is an operator in which a range and a type of activity of people and goods under a condition set in the conditional operator are described. For example, a range related to time is set in the conditional operator and a range related to activity space is set in the target operator. In another example, a temporal and spatial range related to goods may be set in the conditional operator and activity information related to people and money may be set in the target operator.

The arithmetic operator (213) materializes a value of an index predefined under the conditions of the two operators described above (that is, specific time range, spatial range, organizational attributes of a person, and the like). An example of the conditional operator (211) is a salesclerk, a customer, or a combination of a customer and a staying time of the customer in a store. As an example of the target operator (212), a merchandise area in a store or the like is assumed. As an example of the arithmetic operator (213), sales per customer, a staying time, a service time, and the like are used. A large number of explanatory variables are generated by performing arithmetic processing among a plurality of operators so that only one operator varies and the other operators are fixed among these operators.

As an example, an example of generation of explanatory variable related to a purchase activity of a customer in a store will be described with reference to FIG. 4. Times when each customer enters and leaves a store are obtained and a period of time between the time when the customer enters the store and the time when the customer leaves the store is set in the conditional operator. Next, a merchandise area of customer purchase is set in the target operator and a staying time of the customer, a purchase price, and the number of people who serve the customer are set in the arithmetic operator (213). FIG. 4 shows a specific example in which explanatory variables for each customer are automatically generated. In each column, the time when the customer enters the store and the time when the customer leaves the store are calculated as time information (420) for each customer ID (410) and, for this conditional operator (211), indexes corresponding to a customer staying time for each area (430), a customer purchase price for each area (440), and the number of people who serve the customer for each area (450) are automatically calculated and stored by using information of merchandise category areas (entire store, area 1, area 2, ..., area 5) in the store as the target operator (212). These processes are performed for each customer ID, so that data is added in the row direction. More specifically, to obtain the customer staying time for each area (430) for each area, mapping information between in-store location information and merchandise category areas is prepared in advance and a configuration is employed in which area information of a merchandise category can be extracted when sequential in-store location information is inputted. Further, to obtain the number of employees who serve the customer for each area (450), in the same manner, a configuration may be employed in which corresponding area information can be extracted by using in-store location information where the service occurs as a key. Further, to obtain the customer purchase price for each area (440), normally, an item for sale purchased by the customer may be associated with a merchandise category area by using a merchandise classification table managed by a POS information system in the store. In this example, a large number of variables are generated by increasing the number of area definitions which are the target operators (212) and the types of arithmetic operators. In this way, it is possible to generate a large number of explanatory variables (400) by arithmetic processing using the conditional operator (211), the target operator (212), and the arithmetic operator (213), which are set in advance.

By using the analysis system of the present invention in this way, the explanatory variables related to the objective variable can be obtained or the strength of correlation between the objective variable and the explanatory variables can be obtained by the correlation analysis of a large amount of data. For example, if an analysis result showing that a sales clerk staying in a specific area correlates to the sales of the store can be obtained, it is possible to easily determine measures to improve the business performance.

By using the analysis system of the present invention in this way, it is possible to find measures to achieve an object, which could not have been identified by a human being. In summary, it is possible to identify a factor which lurks in a large amount of data and affects the business performance and utilize the factor for decision-making.

Second Embodiment

Figure 11:
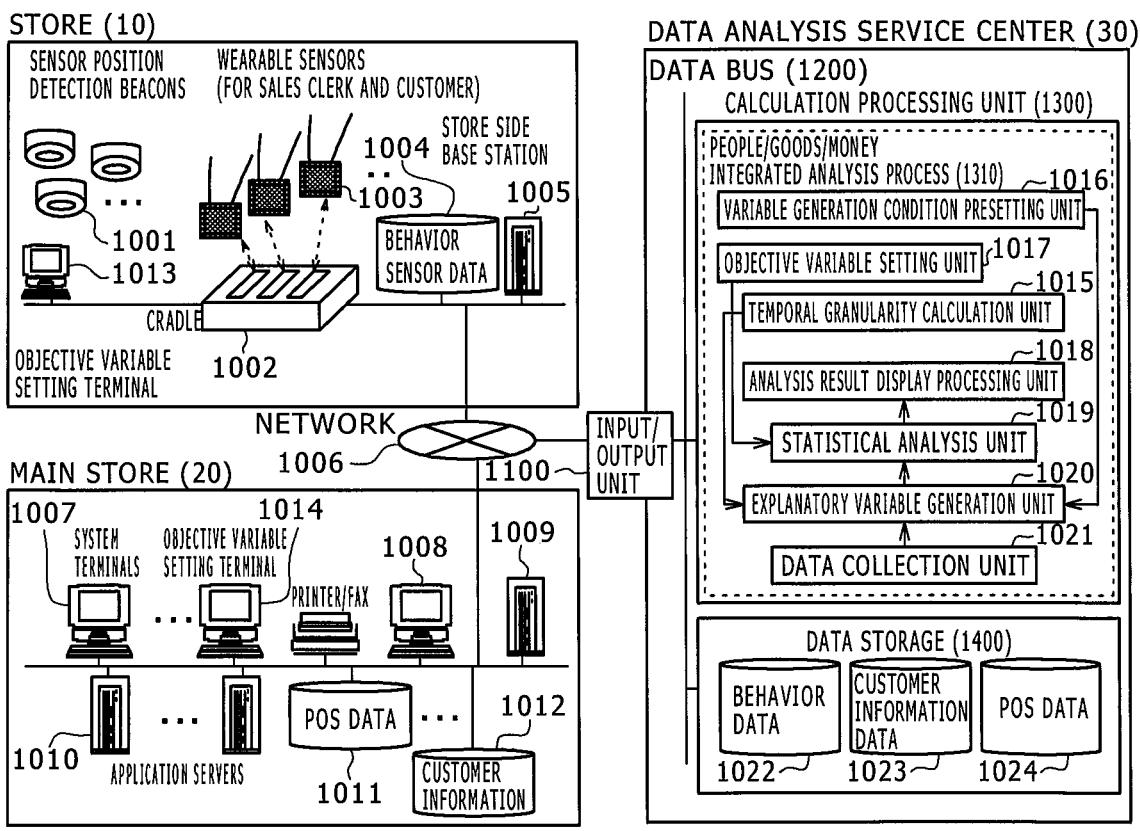
FIG. 11 is a diagram showing an example of a system configuration in a people/goods/money integrated analysis engine of the present invention.

FIG. 11 shows another configuration of the system configuration of the present invention.

In FIG. 11, in the people/goods/money integrated analysis process (1310) in FIG. 10, a calculation of temporal granularity is automatically performed in a temporal granularity calculation unit (1015) at a timing when an objective variable is set by the objective variable setting unit (1017) and information of the temporal granularity is transmitted to the explanatory variable generation unit (1020). In the temporal granularity calculation unit (1015), the analysis result outputted from the statistical analysis unit (1019) in FIG. 10 is adjusted to a temporal granularity (for example, one minute, one hour, one day, one month, or the like) suitable to a calculation of correlation with the objective variable and outputted. The process in the temporal granularity calculation unit (1015) is implemented by holding a calculation logic corresponding to a target index or having a temporal granularity table corresponding to a target index, which is assumed to be inputted, in advance. For example, information of correspondence relationship such as a granularity of one day to analyze sales for each season and a temporal granularity of 30 minutes to analyze factors of sales in one day is prepared in advance.

Figure 3:
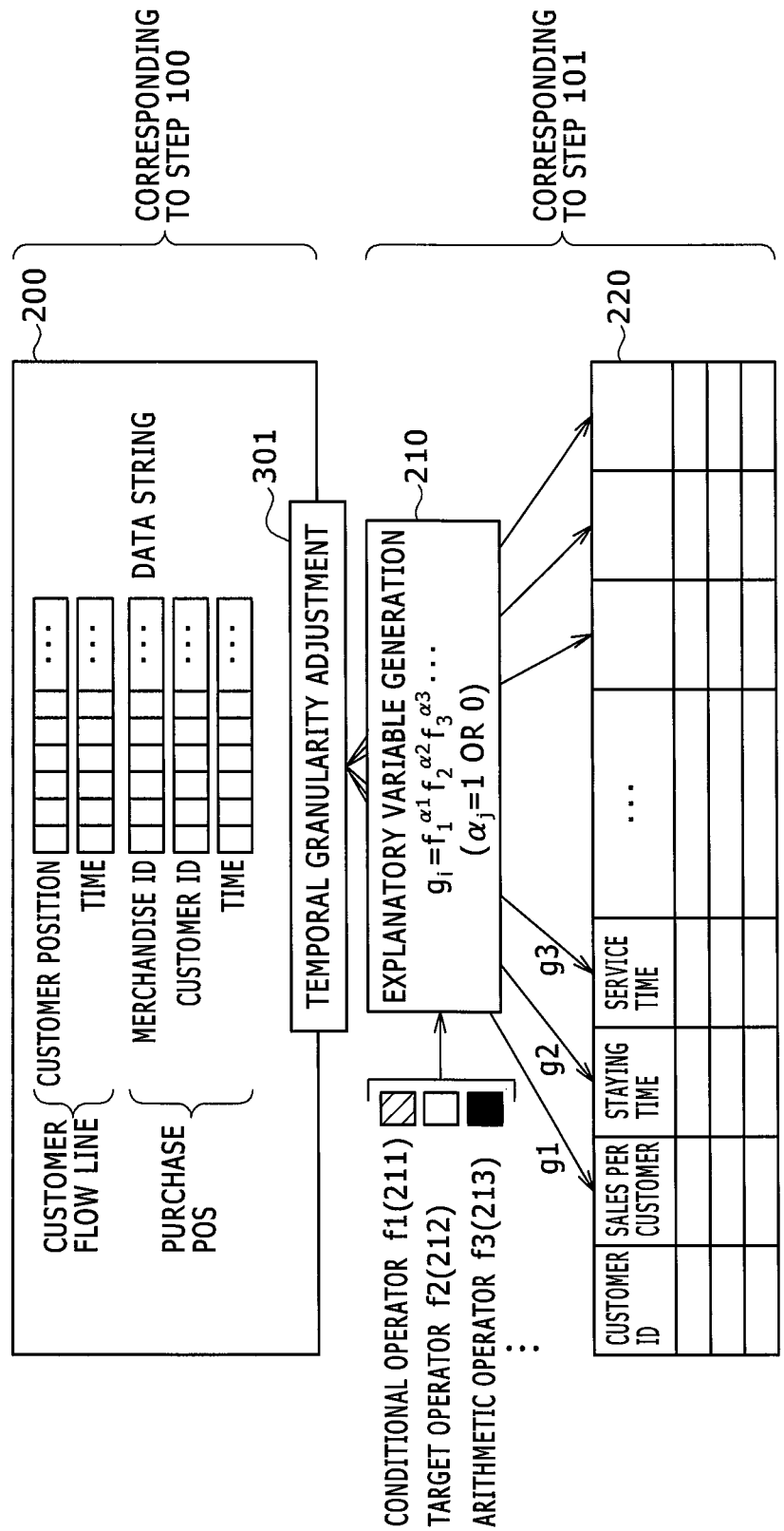
FIG. 3 is a diagram showing the index generation method of the data analysis system of the present invention.

FIG. 3 shows another example of the details of the method of automatically generating a large number of explanatory variables. When the data string (200) is inputted into the analysis system, explanatory variables are generated (210) by a set of three operators, a conditional operator (211), a target operator (212), and an arithmetic operator (213), which are set in advance. When explanatory variables are generated by the arithmetic operator, the temporal granularity is adjusted (301) by an instruction from the temporal granularity calculation unit (1015). The temporal granularity is set in the conditional operator (211) when the explanatory variables are generated (210). The operations of the other operators are the same as those described in FIG. 2.

FIG. 5 shows another specific example of the generated explanatory variables.

A time width (30 minutes in the example of FIG. 5) in the business hours of the store is set in the conditional operator as the temporal granularity. A merchandise area is set in the target operator in the same manner as in FIG. 4, and a purchase price, the number of purchased items, and a location of sales clerk are set in the arithmetic operator (213). In each column, for each time information (510) set as the conditional operator, a purchase price for each area (520), the number of purchased items for each area (530), and locations of sales clerks for each area (540) are automatically calculated and stored. In this way, it is possible to generate a large number of explanatory variables (500) by arithmetic processing using the conditional operator (211), the target operator (212), and the arithmetic operator (213), which are set in advance. For example, the following use cases are possible: the temporal granularity is set to 30 minutes as shown in FIG. 5 in conjunction with objective variable setting when obtaining a spreading effect by using a stocking shelves time period change in the target variable store as the objective variable and the temporal granularity is set to one day in conjunction with objective variable setting when obtaining a spreading effect by using a sales change due to distribution of advertisements as the objective variable.

Figure 7:
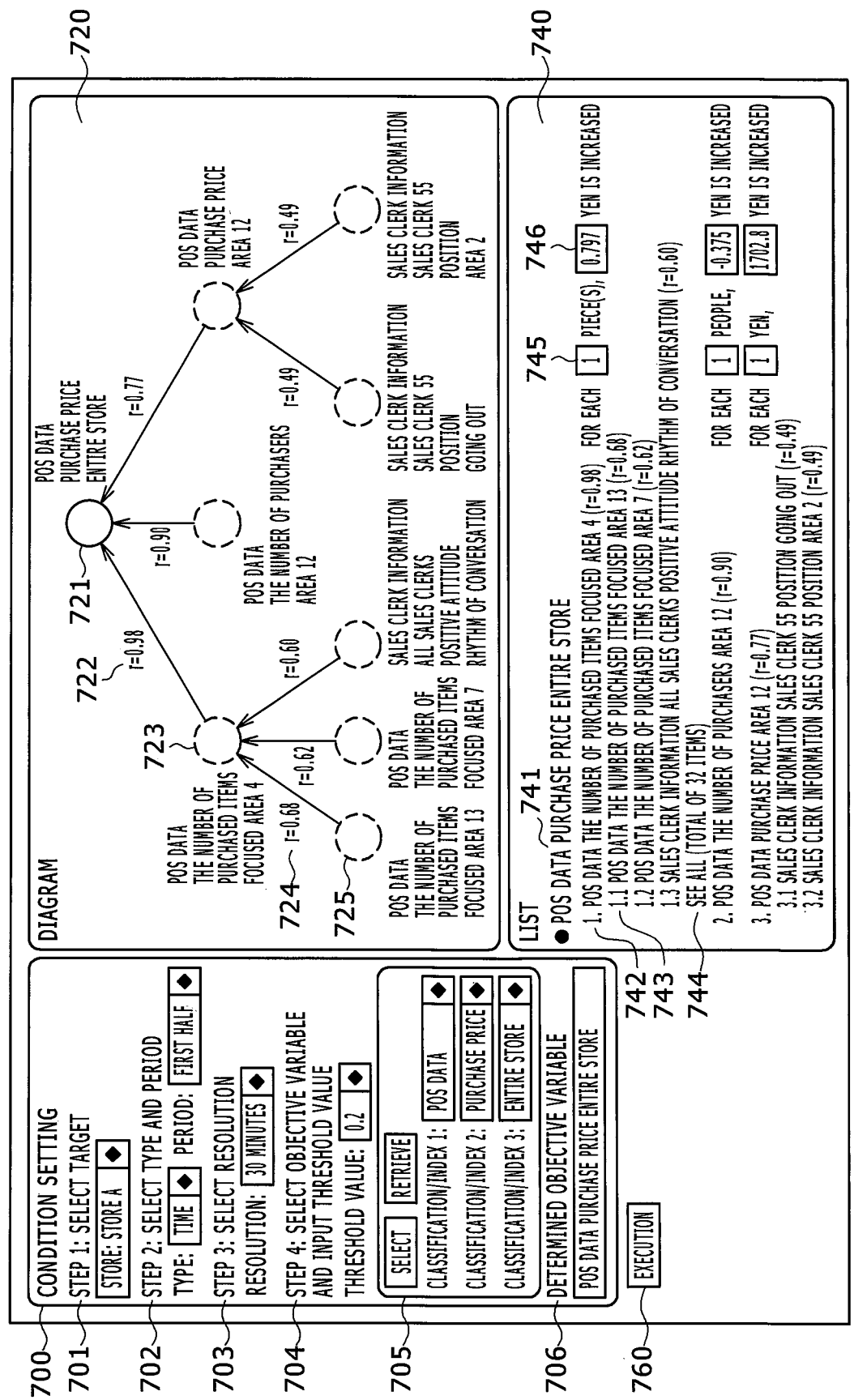
FIG. 7 is a diagram showing an application screen of the data analysis system of the present invention.

Next, FIG. 7 shows an application example performed in the analysis system of the present invention.

FIG. 7 is an application screen for retrieving explanatory variables contributing an objective variable from the objective variable and displaying the explanatory variable. This clarifies what factors (explanatory variables) constitute a specified event (objective variable). It is possible to convert a complicated event into a combination of a plurality of simple factors by using this application. The application in FIG. 7 includes a condition setting (700), a diagram (720), a list (740), and an execution button (760). The condition setting 700 is a screen for setting a period, a target, and an objective variable. The diagram (720) is a screen for performing retrieval from the content specified in the condition setting (700) and displaying a diagram of a tree structure. The list (740) is a screen for performing retrieval from the content specified in the condition setting (700) and displaying a list of itemized texts. Execution of a process is started when the execution button (760) is clicked after the period, the target, and the objective variable are specified in the condition setting (700).

First, the screen for setting the period, the target, and the objective variable in the condition setting (700) will be described.

STEP 1 (701) is an item for specifying a target. This item is used to specify a target used in the analysis. In this example, the target is a store A. STEP 2 (702) is an item for specifying a type and a period. The type is a criterion when the analysis is performed. It is possible to specify whether an analysis is based on time or based on human by specifying the type. The period is a date and time section used in the analysis. STEP 3 (703) is an item for specifying a resolution. This item is used to specify a time resolution used in the analysis. STEP 4 (704) is an item for specifying an objective variable. For example, STEP 3 (703) and STEP 4 (704) mean input reception of objective variable in a workflow in FIG. 1. Before processing STEP 4 (704), it is necessary to specify a target used in the analysis from the variables registered in FIGS. 4 and 5, and a process to specify the target is performed in STEP 3 (703). For example, regarding the period, it is possible to select a target used in the analysis from period by seeing date of the time information (420) in FIG. 4 and 30-minute time period of the time information (510) in FIG. 5.

It is necessary to select one objective variable from the variables registered in FIGS. 4 and 5. An objective variable selection screen (705) shows a screen for easily selecting one objective variable. There are two types of methods for selecting one objective variable. The two types are selection and retrieval. The objective variable selection screen (705) shows a screen for retrieval. In the selection, variables are hierarchically narrowed down from a large classification to a small classification and the objective variable is selected from the narrowed down variables. In the objective variable selection screen (705), the variables can be narrowed down in the downward direction. In the retrieval, when any character string is inputted, variable names partially matching the character string are selected, so that the objective variable is selected from the variable names.

A threshold value is a reference to obtain explanatory variables contributing the objective variable, specifically a reference value of a contribution ratio of the explanatory variable to the objective variable. Explanatory variables greater than or equal to the threshold value are selected and displayed. A determined objective variable (706) is a screen displaying the objective variable selected in STEP 4 (704).

The diagram (720) is a screen for performing retrieval from the content specified in the condition setting (700) and displaying a diagram of a tree structure. In the method of displaying the tree structure, the circular marks are called a node represent variables and the arrows are called an edge represent relationships. The variables contributing to an upper node are represented by lower nodes, so that hierarchical relationships between variables are represented. It is represented so that the lower the hierarchy, the more the line of the node changes from a solid line to a dashed line. Although three layers are displayed in the diagram (720), any number of layers can be specified. It is possible to show the degree of importance of a variable by writing the degree of contribution on the edge. Regarding the meaning of the orientation of the arrow of the edge, the orientation indicates the contribution of a lower variable to an upper variable. The number written on the edge represents the degree of contribution. In the workflow of FIG. 1, the number is a result of processing from the statistically analyzing correlation between the objective variable (103) and the explanatory variable to the displaying the regression analysis result (105). The degree of contribution may be obtained from a general statistical method. For example, the degree of contribution may be obtained from a correlation coefficient in the displaying correlation analysis result (104) in the workflow of FIG. 1.

The node (721) represents the objective variable. The variable name is written beside the node. The edge (722) represents a relationship between the node (721) and the node (723) as the degree of contribution. The node (723) is an explanatory variable of the node (721). There are three explanatory variables in the same layer and the explanatory variables are arranged in descending order of relationship from the left. When many explanatory variables are selected, it is preferable that the highest three are displayed. The edge (724) represents a relationship between the node (723) and the node (725) as the degree of contribution. Regarding the relationship and the degree of contribution, various other display methods may be used.

The list (740) is a list obtained by converting the diagram display shown in the diagram (720) into a list display. In the list display, a nested structure of the list is employed. The text (741) represents the objective variable. The text (741) is the same as the node (721) in the diagram display shown in the diagram (720). The text (742) is an explanatory variable of the text (741). The number in the parenthesis represents the degree of contribution. The text (742) and the number in the parenthesis are the same as the node (723) and the edge (722) in the diagram display shown in the diagram (720). The text (743) is an explanatory variable of the text (742). The number in the parenthesis represents the degree of contribution. The text (743) and the number in the parenthesis are the same as the node (725) and the edge (724) in the diagram display shown in the diagram (720).

When there are many explanatory variables, it is desirable to display the highest three explanatory variables. When all the variables are desired to be browsed, the text (744) is clicked.

An effect value (746) represents the effect of the text (742) by using an effect unit (745) which is the unit representing the effect of the explanatory variable on the objective variable. The effect is displayed as a number by digitizing and displaying the effect of the text (742) on the text (741). The calculation method of the number may be a general statistical method. For example, the number may be obtained from the regression coefficient in the displaying the regression analysis result (105) in the workflow of FIG. 1. The effect unit (745) represents the unit of the analytical criterion.

The effect value (746) represents a value of the effect in the analytical criterion unit represented by the effect unit (745). This example shows that the text (741) is increased by 0.797 yen for each piece of the text (742).

Execution (760) is an execution button. When the execution (760) is clicked, a calculation is performed under the condition inputted in the condition setting (700). Thereby, the correlation between the objective variable and the explanatory variables are statistically analyzed and the diagram (720) and the list (740) are displayed.

By using the analysis system of the present invention in this way, it is possible to select a target, a type, a period, a resolution, and an objective variable and obtain explanatory variables related to the objective variable by the correlation analysis of a large amount of data. For example, if an analysis result showing that a sales clerk staying in a specific area correlates to the sales of the store can be obtained, it is possible to easily determine measures to improve the business performance.

Third Embodiment

Figure 8:
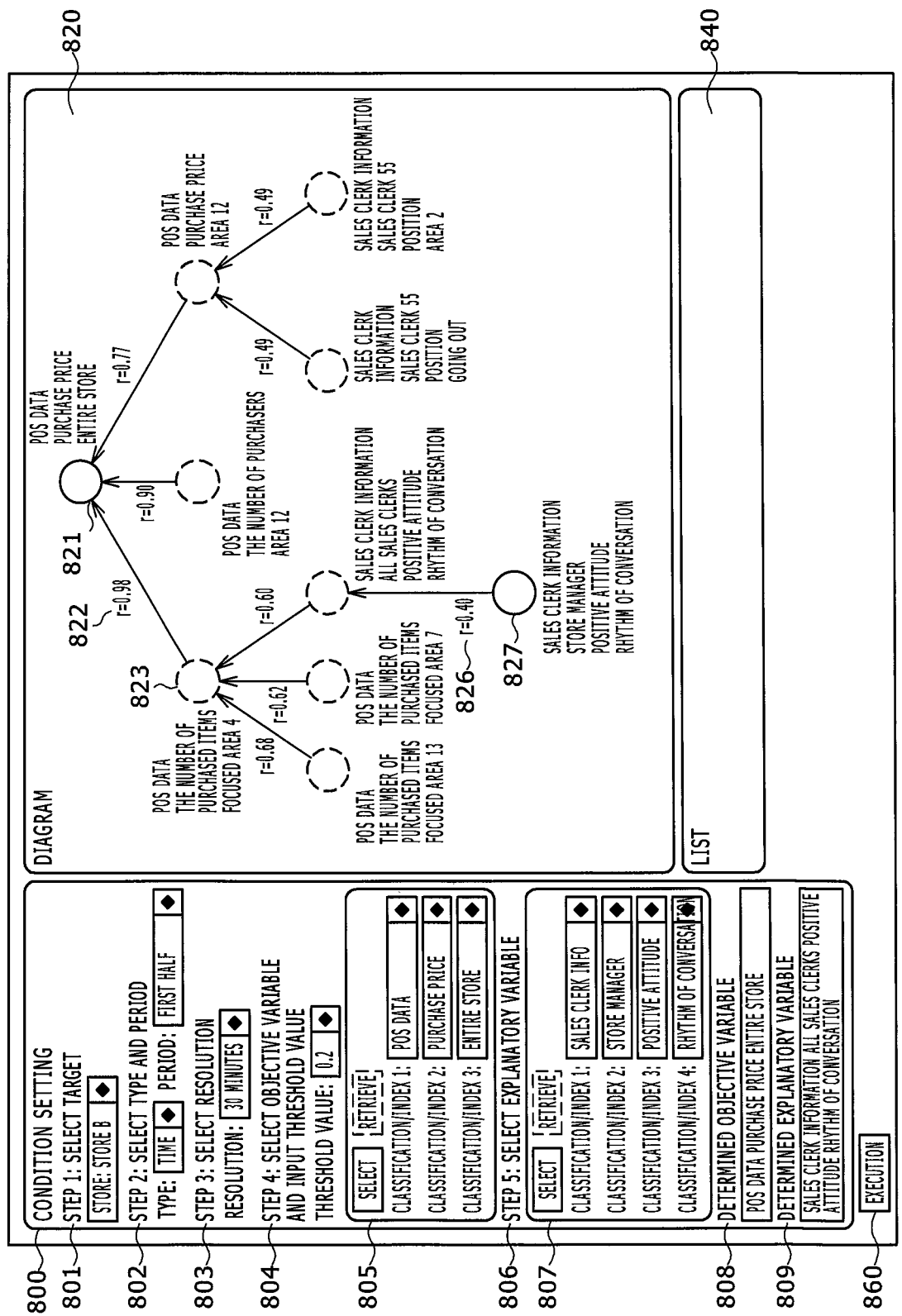
FIG. 8 is a diagram showing an application screen of the data analysis system of the present invention.

Next, FIG. 8 shows another example of the application example performed in the analysis system of the present invention. In FIG. 8, the relationship between the objective variable and the explanatory variable can be known by specifying the objective variable and the explanatory variables.

Figure 14:
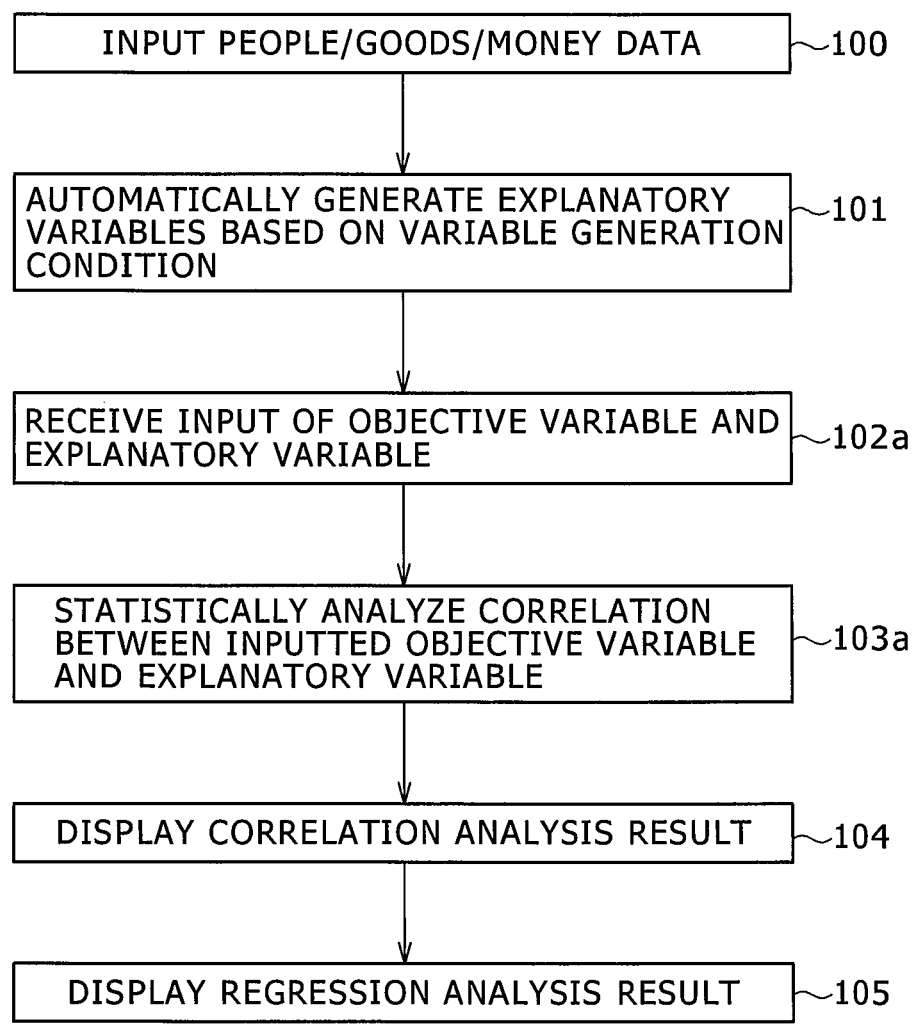
FIG. 14 is a flowchart of a data analysis system of the present invention.

The application includes a condition setting (800), a diagram (820), a list (840), and an execution button (860). The condition setting 800 is a screen for setting the period, the objective variable, and the explanatory variables. The diagram (820) is a screen for performing retrieval from the content specified in the condition setting (800) and displaying a diagram of a tree structure. The list (840) is a screen for performing retrieval from the content specified in the condition setting (800) and displaying a list of itemized texts. Execution of a process is started when the execution button (860) is clicked after the period, the objective variable, and the explanatory variables are specified in the condition setting (800). The flowchart of the above is shown in FIG. 14 and only a difference from FIG. 1 will be described. In step 102a, an input of the objective variable and the explanatory variables are received, and in step 103a, the correlation between the inputted objective variable and explanatory variables are statistically analyzed.

First, a screen for setting the period, the objective variable, and the explanatory variables in the condition setting (800) will be described. The processes from STEP 1 (801) to the objective variable selection screen (805) are the same as those from STEP 1 (701) to the objective variable selection screen (705) in FIG. 7, so that the description will be omitted. STEP 5 (806) is to specify an explanatory variable. The explanatory variable selection screen (807) shows a screen for easily selecting one explanatory variable. There are two types of methods for selecting the explanatory variable. The two types are selection and retrieval. The explanatory variable selection screen (807) is a screen for selection. In the selection, variables are hierarchically narrowed down from a large classification to a small classification and the explanatory variable is selected from the narrowed down variables. In the retrieval, when any character string is inputted, variable names partially matching the character string are selected, so that the explanatory variable is selected from the variable names.

The determined objective variable (808) is a screen displaying the objective variable selected in STEP 4 (805). The determined explanatory variable (809) is a screen displaying the explanatory variable selected in STEP 5 (806).

The diagram (820) is a screen for performing retrieval from the content specified in the condition setting (800) and displaying a diagram of a result of the retrieval by a tree structure. In the method of displaying the tree structure, the circular marks are called a node represent variables and the arrows are called an edge represent relationships. The variables contributing to an upper node are represented by lower nodes, so that hierarchical relationships between variables are represented. It is represented so that the lower the hierarchy, the more the line of the node changes from a solid line to a dashed line. The process is repeated until the explanatory variables specified in STEP 5 (806) is displayed. The frame lines of the circular marks of the variable (821) that that is the objective variable specified in STEP 4 (804) and the variable (827) that is the explanatory variable specified in STEP 5 (806) are thickened, so that the relationship between the two variables can be easily understand.

The display method of the diagram in FIG. 8 is the same as that of the diagram (720) in FIG. 7, so that the description will be omitted.

The list (840) is a list obtained by converting the diagram display shown in the diagram (820) into a list display. In the list display, a nested structure of the list is employed. The display method of the list (840) is the same as that of the list (740) in FIG. 7, so that the description will be omitted. As shown by the diagram (840), the list can be minimized.

When the execution button (860) is clicked, a calculation is performed under the condition inputted in the condition setting (800) and the diagram (820) and the list (840) are displayed.

By using the analysis system of the present invention in this way, the strength of correlation between the objective variable and the explanatory variable can be obtained by the correlation analysis of a large amount of data. For example, if an analysis result showing that a sales clerk staying in a specific area correlates to the sales of the store can be obtained, it is possible to easily determine measures to improve the business performance.

By using the analysis system of the present invention in this way, it is possible to find measures to achieve an object, which could not have been identified by a human being. In summary, it is possible to identify a factor which lurks in a large amount of data and affects the business performance and utilize the factor for decision-making.

Fourth Embodiment

Figure 12:
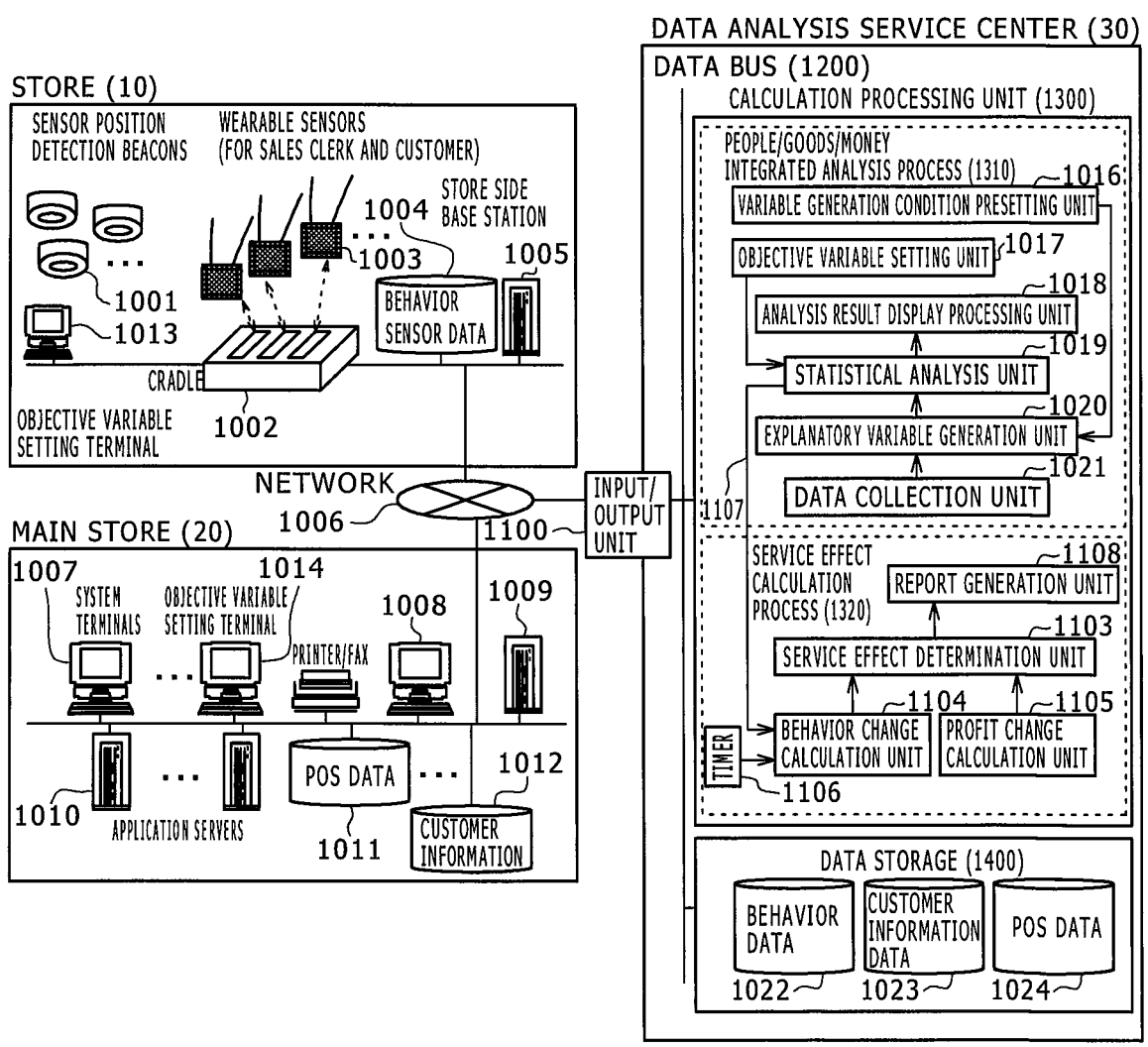
FIG. 12 is a diagram showing an example of a system configuration in a people/goods/money integrated analysis engine of the present invention.

It is risky for business management to introduce an unknown measure to improve business performance. It is important to construct a service model to reduce the risk. FIG. 12 is an analysis system configuration example on the service provider side and the customer side of such a service.

The calculation processing unit (1300) in the data analysis service center (30) shown in FIG. 12 includes a "service effect calculation process (1320)" in addition to the "people/goods/money integrated analysis process (1310)". The service effect calculation process (1320) includes a behavior change calculation unit (1104) that calculates a behavior change, a profit change calculation unit (1105) that calculates a profit change from the amount of profit and the like from the POS data (1024) in the data storage (1400), and a service effect determination unit (1103) that compares both the behavior change and the profit change. Information of the behavior change (1107) is outputted from the statistical analysis unit (1019) to the behavior change calculation unit (1104). The service effect calculation process (1320) further includes a timer (1106) to provide a timing cycle of the process in the service effect determination unit (1103) and a report generation unit (1108) to output a result from the service effect determination unit (1103). For example, it is possible for the service effect determination unit (1103) to quantitatively evaluate how the profit and the like contribute when the behaviors of a customer and an employee change in the store.

Figure 6:
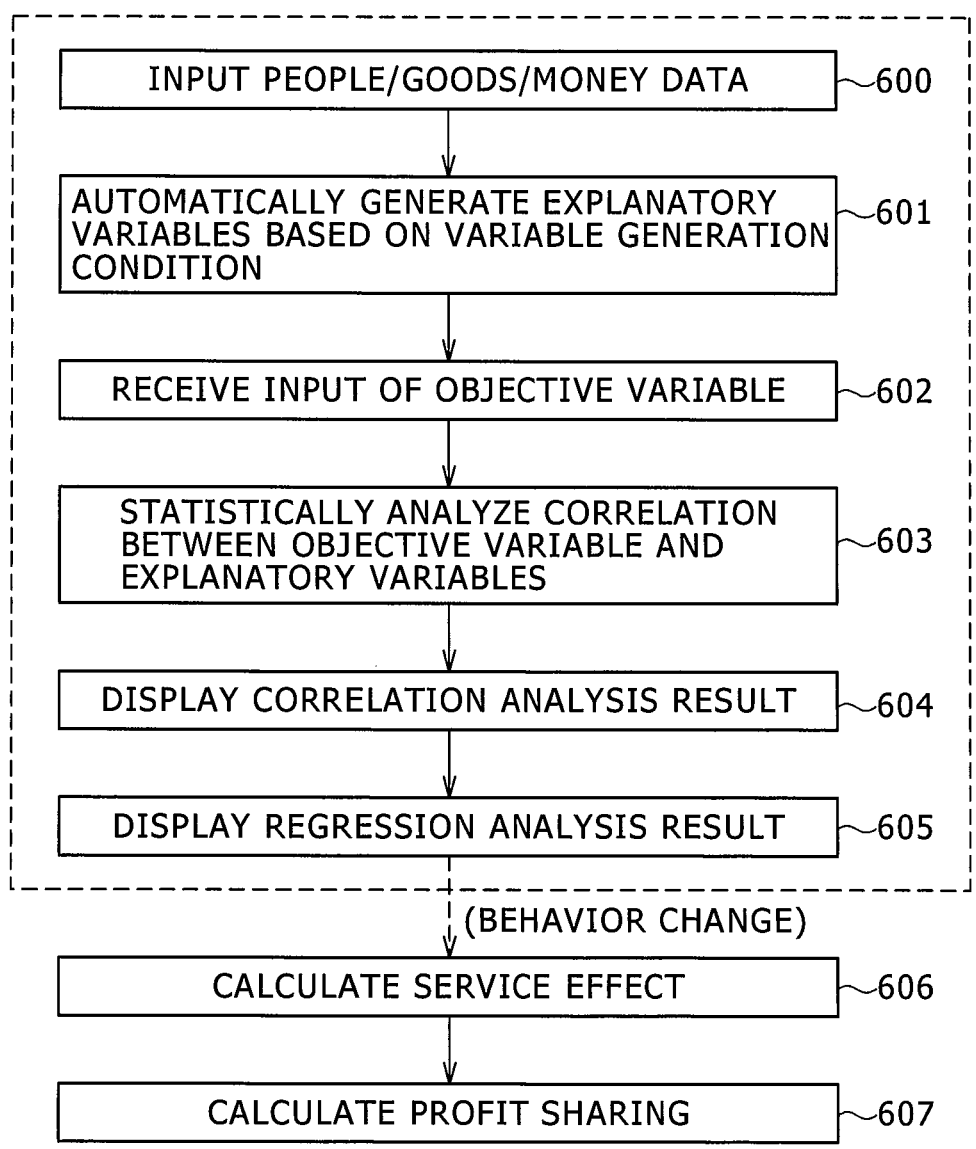
FIG. 6 is a flowchart of a data analysis system of the present invention.

FIG. 6 shows an analysis procedure to calculate the service effect and profit sharing by a behavior proposal of the analysis system. After the procedure (corresponding to steps 600 to 605) shown in FIG. 1, the service effect is calculated (step 606) and then the profit sharing is calculated (step 607).

Figure 9:
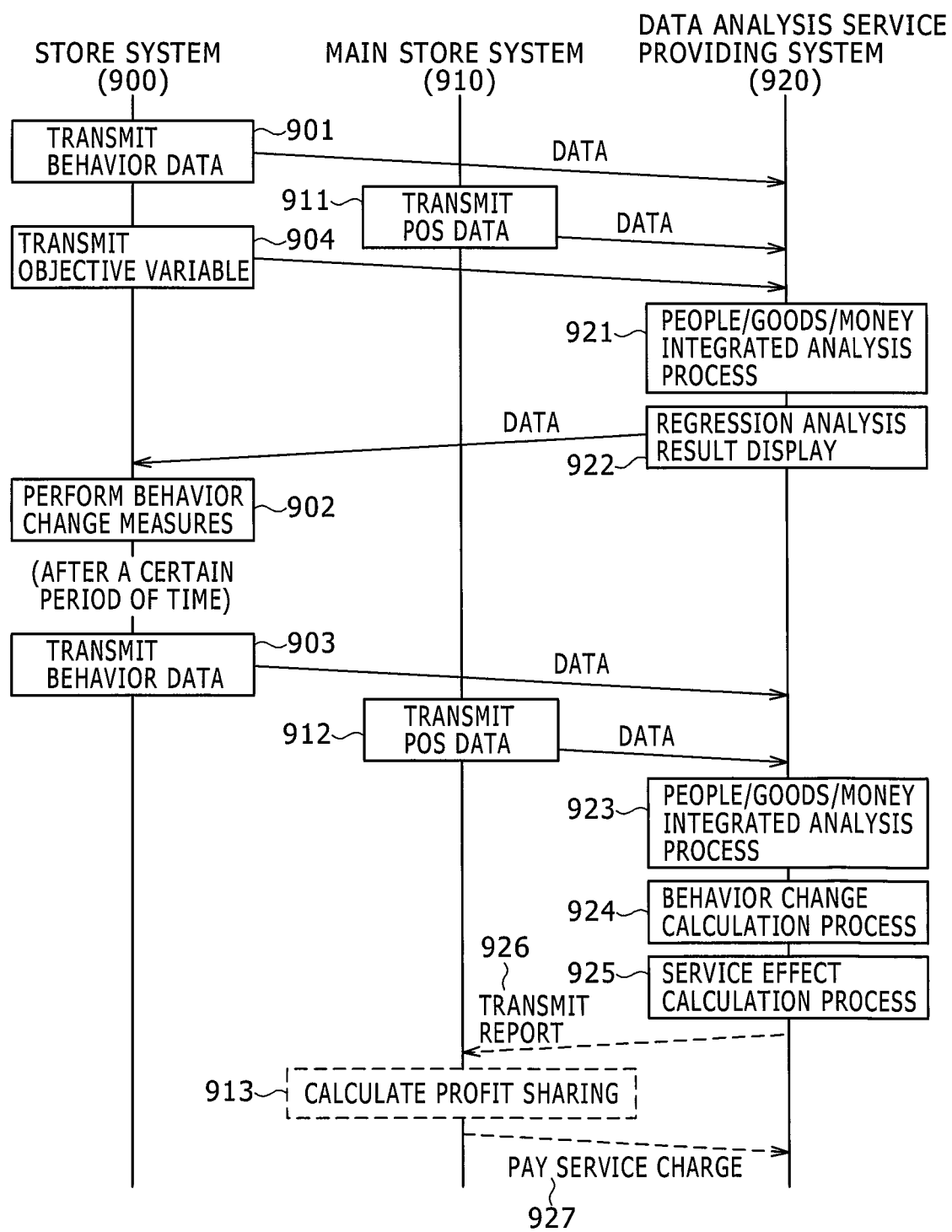
FIG. 9 is a flowchart of a service model in which the data analysis system of the present invention is utilized.

FIG. 9 show a flow of a profit sharing type service which is implemented by the analysis system shown in FIG. 12 and the analysis procedure shown in FIG. 6.

First, behavior data (901) is transmitted from a store system (900) to a data analysis service providing system (920) and POS data (911) is transmitted from a main store system (910) to the data analysis service providing system (920). Next, a manager (store manager or the like) of each store inputs objective variables, which may affect management performance, such as sales, sales per customer, and the number of customers who come to the store, and transmits the objective variables to the data analysis service providing system (904). The input of the objective variables may be performed by using the main store system. The data analysis service providing system (920) performs a people/goods/money integrated analysis process (921) and transmits a regression analysis result display (922) to the store system (900) as a result of the people/goods/money integrated analysis process. The manager of each store performs necessary behavior change measures (902) according to information display obtained as a result by using the store system (900). The regression analysis result display may be transmitted to the store system and the main store may determine the behavior change measures and notify the store of the measures.

After a certain period of time, the data analysis service providing system performs a people/goods/money integrated analysis process (923) by using behavior data (903) and POS data (912) and further performs a behavior change calculation process (924) and a service effect calculation process (925) by using data of the previous people/goods/money integrated analysis process (921). Although the processes (steps 923, 924, and 925) are performed after a certain period of time in the above procedure, the data analysis service providing system may analyze behavior data from the store after transmitting the regression analysis result display (922) and, for example, when a change of behavior of an employee is detected, the data analysis service providing system may determine a time point of the change of behavior to be a boundary between the previous analysis and the current analysis and may perform the people/goods/money integrated analysis by data from the store and perform the behavior change calculation process and the service effect calculation process. Thereby, a change of behavior can be detected more easily than in a case in which calculation is automatically performed after a certain period of time. Although not shown in the drawings, the data analysis service providing system may receive information indicating that an instruction related to a behavior change of an employee is issued in the store from the store and determine a boundary between the previous data from the store and the current data from the store by using this information as a trigger. In this case, although the data analysis service providing system needs a step to receive information from the store, the data analysis service providing system can surely know the boundary between the previous data and the current data.

A report based on the service effect calculation process (925) is transmitted to the main store system (910) from the data analysis service providing system (920) and a necessary profit sharing calculation process (913) is performed by the main store system (910). According to the result of the above process, the main store system (910) pays a service charge to the data analysis service providing system (920).

In the actual service, for example, a method is considered in which an agreement that an amount of money obtained by multiplying the profit or the amount of increase of sales in the stores by a certain rate is received as a service price is made in a service use contract between a customer and a service providing side.

Figure 13:
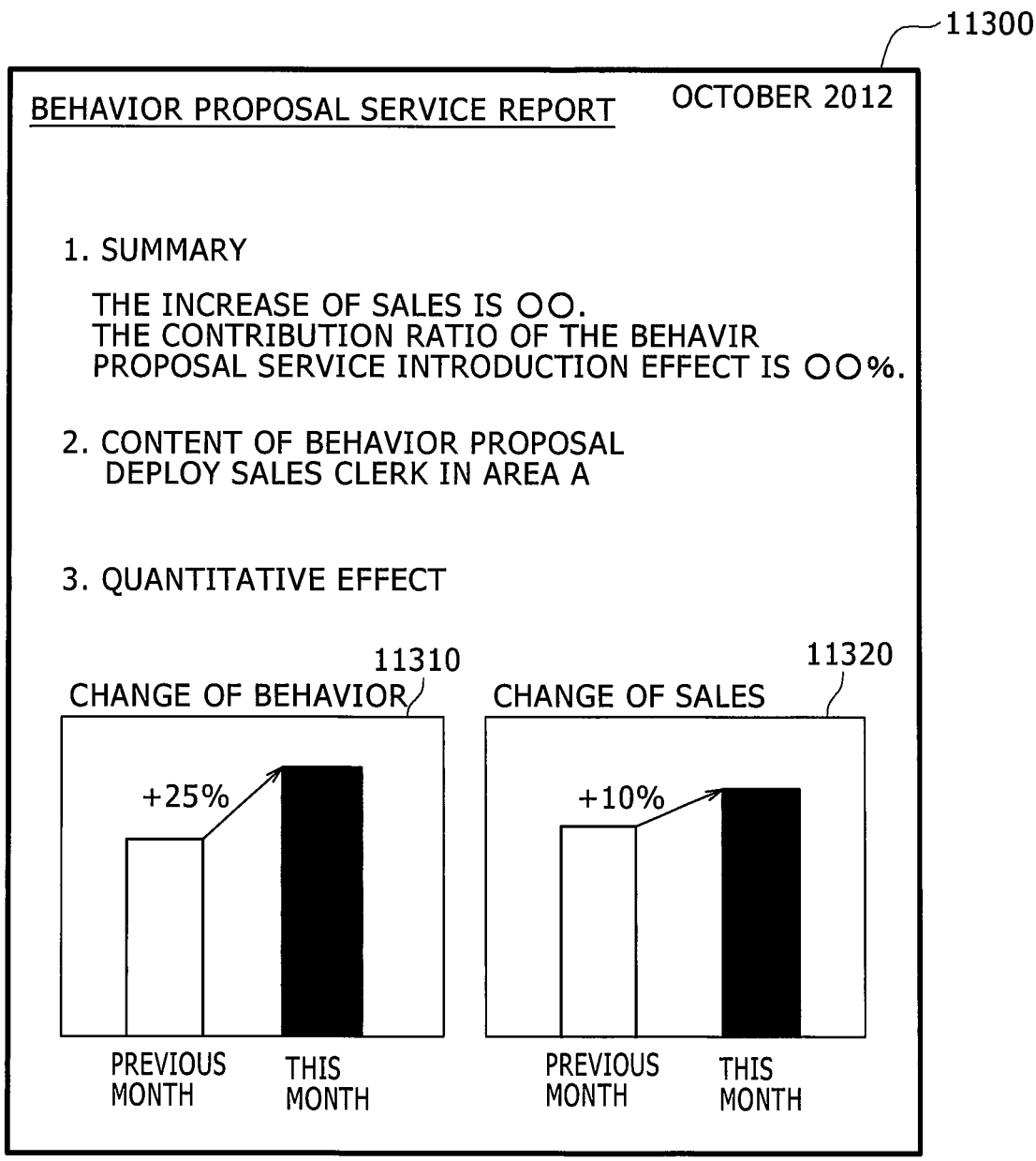
FIG. 13 is a diagram of a report of a service model in which the data analysis system of the present invention is utilized.

FIG. 13 shows an example of a report (11300) periodically transmitted from the data analysis service providing system (920) to the main store system (910). In this report, an increase of sales in a specific period and a contribution ratio of a behavior proposal service introduction effect are written as a summary. Further, content of proposed behavior provided by the data analysis service is written. Further, a change of behavior (11310) and a change of sales (11320) in the period are shown. The contribution ratio of the behavior proposal service introduction effect described above is calculated by an algorithm not shown in the drawings by considering connection between the change of behavior (11310) and the change of sales (11320).

Although, in this example, an example is described in which a report of one period is transmitted in one report, a method can be considered in which contents of a plurality of reports for a plurality of periods are collectively transmitted.

In this way, it is possible to implement a contingency fee type service contract between the service providing side and the customer side by the analysis system and flow of the present invention. By signing such a contract, it is possible to receive a contingency fee according to an amount of increase when a profit increases while reducing a fixed charge of a user by reducing a fixed service usage fee (for example, receiving a fixed amount of money every month). In summary, it is possible for a customer to reduce the risk of introducing the service, so that the introduction and diffusion of the service are promoted.

INDUSTRIAL APPLICABILITY

The present invention relates to a data analysis system for supporting decision making in management and the present invention can be used to improve operation in a store, improve services in the fields of nursing and hospital and the fields of restaurants, and improve productivity of intellectual work by customizing the data analysis system according to each field.

What is claimed is:
1. An integrated data analysis system in which a plurality of explanatory variables are generated in advance to explain possible causes for a result, represented by an objective variable, that is selected from the explanatory variables after the explanatory variables have been generated, comprising:
 a plurality of location sensing devices arranged at various positions to collect location information of locations of a first plurality of persons over a first period of time and output the collected information as first behavior sensor data of the first plurality of persons; and
 a behavior sensor data storage which stores the first behavior sensor data;
 a processor coupled to the information data storage and the behavior sensor data storage; and
 a memory coupled to the processor and storing instructions that cause the processor to execute:
  an explanatory variable generation unit that generates the plurality of explanatory variables, prior to receiving an input of the objective variable, from at least the first behavior sensor data using variable generation condition information including a plurality of operators which include a plurality of conditional operators in each of which an activity main body or a range of time condition of the first behavior sensor data is set, a plurality of target operators in each of which a range and a type of activity of the first plurality of persons is set, and a plurality of arith- metic operators in each of which an index for the conditional operators and the target operators is set,
wherein for generating the explanatory variables, the respective conditional operators are varied while each of the respective target operators and the respective arithmetic operators are fixed, additionally the respective target operators are varied while each of the respective conditional operators and the respective arithmetic operators are fixed, and additionally the respective arithmetic operators are varied while the respective conditional operators and the respective target operators are fixed;
an objective variable input unit that receives an input specifying the objective variable from the explanatory variables;
a correlation calculation unit that calculates a plurality of correlations between different ones of the explanatory variables, and a plurality of correlations between the objective variable and the explanatory variables;
a display unit that displays the correlations between the objective variable and certain ones of the explanatory variables and the correlations between the certain ones of the explanatory variables and other explanatory variables on a screen; and
a behavior change calculation unit to calculate a change in at least one type of behavior by at least one person to effect a change in the behavior sensor data generated by the at least one type of behavior by the at least one person to improve the result reflected by the objective variable and to instruct the change in the at least one type of behavior by the at least one person, and
wherein the location sensing devices collect location information of locations of a second plurality of persons over a second period of time after the first period of time and output the collected information as second behavior sensor data of the second plurality of persons,
wherein the behavior sensor data storage stores the second behavior sensor data,
wherein the explanatory variable generation unit separately generates the plurality of explanatory variables from the first and second behavior sensor data using the variable generation condition information, and
wherein the correlation calculation unit separately calculates the plurality of correlations between different ones of the explanatory variables, and the plurality of correlations between the objective variable and the explanatory variables for the first period of time and the second period of time.

2. The integrated data analysis system according to claim 1,
wherein the memory further stores instructions that cause the processor to execute:
a temporal granularity unit to adjust a temporal granularity of the explanatory variables suitable to calculate the correlations between the objective variable and the explanatory variables.

3. The integrated data analysis system according to claim 2,
wherein one or more of the conditional operators includes the temporal granularity, and
wherein the explanatory variable generation unit generates the explanatory variables based on the temporal granularity.

4. The integrated data analysis system according to claim 1,
wherein the memory further stores instructions that cause the processor to execute:
an analysis condition input unit to receive inputs of an analysis type, an analysis period, and an analysis resolution, and
wherein the correlation calculation unit calculates the correlations between the different ones of the explanatory variables, and the correlations between the objective variable and the explanatory variables on the basis of the analysis type, the analysis period, and the analysis resolution.

5. The integrated data analysis system according to claim 1,
wherein the correlation calculation unit calculates a plurality of contributions of the correlations between different ones of the explanatory variables to the correlations between the objective variable and the explanatory variables, and
wherein the display unit displays the objective variable, the explanatory variables, and the contributions on the screen.

6. The integrated data analysis system according to claim 1,
wherein the correlation calculation unit calculates an effect of the explanatory variables to the objective variable from the correlations and an effect value which represents the effect in terms of a unit of the explanatory variables, and
wherein the display unit displays the effect and the effect value on the screen.

7. The integrated data analysis system according to claim 1,
wherein the memory further stores instructions that cause the processor to execute:
a determined explanatory variable input unit to receive an input of a particular one of the explanatory variables, and
wherein the correlation calculation unit calculates correlation between the objective variable and the particular explanatory variable by using the particular one of the explanatory variables.

8. The integrated data analysis system according to claim 1,
wherein the memory further stores instructions that cause the processor to execute:
a profit change calculation unit that calculates profit change information on the basis of item information of items purchased over the first period of time and over the second period of time,
a service effect determination unit that calculates a service effect on the basis of the change in the one or more of the locations of certain persons and the behavior of the certain persons in the second period of time from the first period of time and the profit change information, and
a profit sharing calculation unit that calculates a profit sharing ratio on the basis of the calculated service effect.

9. The integrated data analysis system according to claim 1, further comprising:
a point of sale (POS) data storage which stores POS data, wherein the explanatory variable generation unit generates the plurality of explanatory variables from the first behavior sensor data and the POS data using the variable generation condition information.

10. An integrated data analysis system in which a plurality of explanatory variables are generated in advance to explain possible causes for a result, represented by an objective variable, that is selected from the explanatory variables after the explanatory variables have been generated, comprising:
- a behavior sensor data storage which stores first behavior sensor data of various types of behavior by various persons for a first time period;
- a processor coupled to the storage unit and the behavior sensor data storage; and
- a memory coupled to the processor and storing instructions that cause the processor to execute:
  - an explanatory variable generation unit that generates the plurality of the explanatory variables from at least the first behavior sensor data, prior to receiving an input of the objective variable, using variable generation condition information including a plurality of operators which include a plurality of conditional operators in each of which at least one type of information from the stored behavior sensor data is set, a plurality of target operators in each of which a range of the stored behavior sensor data is set, and a plurality of arithmetic operators in each of which an index for the conditional operators and the target operators is set, wherein for generating the explanatory variables, the respective conditional operators are varied while each of the respective target operators and the respective arithmetic operators are fixed, additionally the respective target operators are varied while each of the respective conditional operators and the respective arithmetic operators are fixed, and additionally the respective arithmetic operators are varied while the respective conditional operators and the respective target operators are fixed;
  - an objective variable input unit that receives an input specifying the objective variable from the explanatory variables;
  - a correlation calculation unit that calculates a plurality of correlations between different ones of the explanatory variables, and a plurality of correlations between the objective variable and the explanatory variables;
  - a display unit that displays the correlations between the objective variable and certain ones of the explanatory variables and the correlations between the certain ones of the explanatory variables and other explanatory variables on a screen; and
  - a behavior change calculation unit to calculate a change in at least one type of behavior by at least one person which improves the result, represented by the objective variable, and to instruct the change in at least one type of behavior by at least one person,
- wherein the behavior sensor data storage further stores second behavior sensor data of various types of behavior by various persons for a second period of time after said first period of time,
- wherein the explanatory variable generation unit separately generates the plurality of explanatory variables from the first and second behavior sensor data using the variable generation condition information,
- wherein the correlation calculation unit separately calculates the plurality of correlations between different ones of the explanatory variables, and the plurality of correlations between the objective variable and the explanatory variables for the first period of time and the second period of time.

11. The integrated data analysis system according to claim 1, wherein the memory further stores instructions that cause the processor to execute:
- a change calculation unit to calculate a quantity of a measured change in the behavior sensor data corresponding to the change instructed by the behavior change calculation unit.

* * * * *